Patented Aug. 3, 1943

2,325,668

UNITED STATES PATENT OFFICE 2,325,668

COMPOSITE MATERIAL

Camille Dreyfus, New York, N. Y.

No Drawing. Application November 8, 1940,
Serial No. 364,887

6 Claims. (Cl. 154—45.9)

This invention relates to composite material for use in the manufacture of vehicle bodies or parts thereof and like articles.

An object of my invention is to produce vehicle bodies or parts thereof and like articles that are lighter in weight and more easily made than those heretofore employed, wherein there is employed sheets comprising sheet metal laminated or composited with a sheet or layer comprising plastic material and especially organic plastic materials.

Other objects of my invention will appear from the following detailed description.

In the making of the bodies of vehicles such as motor cars, railroad passenger or freight cars, locomotives, etc., there are employed sheets of metal such as steel of various compositions. In order that such bodies have the required strength to protect the occupants or material contained therein against injury upon collision or other mishap, the metal sheets employed are of appreciable thickness. These relatively thick metal sheets have the disadvantages of greatly increasing the weight of the vehicle bodies and also of requiring expensive and massive tools to shape them.

I have found that if sheet material comprising metal sheet material laminated or composited with sheet material comprising plastic material particularly of organic nature is used in making vehicle bodies or parts thereof, there may be formed vehicle bodies or parts thereof that are as effective as, if not more so than, vehicle bodies made entirely of metal sheet material of appreciably greater thickness than the metal sheets used in the laminated product. This is probably so because when such laminated material is struck by a blow such as may occur in a vehicle accident, the organic plastic material yields and buffers the blow. Since the specific gravity of organic plastic material is appreciably less than that of metals, the vehicle bodies or parts thereof are lighter in weight than those made entirely of metal, and, moreover, since organic plastic sheet material is easily molded or shaped and only thin metal sheets are used in the laminated material of this invention, the same can be readily shaped and therefore relatively light tools and presses may be used for the purpose.

According to my invention, then, vehicle bodies or parts thereof or other articles are made from sheet material comprising one or more sheets or layers of plastic material and preferably organic plastic materials laminated or composited with one or more layers of sheets of metal.

While I prefer to use cellulose acetate as the plastic organic material, and the invention will be specifically described in connection therewith, other materials may be used such as cellulose aceto-propionate, cellulose aceto-butyrate and cellulose aceto-stearate. However, this invention is applicable to a large range of other plastic organic or inorganic substances, such as, for example, other thermoplastic cellulose derivatives, e. g. cellulose propionate, butyrate, stearate and propio-stearate, cellulose ethers such as ethyl cellulose and benzyl cellulose, and ether-esters of cellulose such as ethyl cellulose acetate and oxy-ethyl cellulose acetate, nitrocellulose, polyvinyl esters and ethers, e. g. polyvinyl acetate, polyvinyl chloride, polyvinyl-chlor-acetate and copolymers of vinyl acetate and vinyl chloride, polymerized esters of unsaturated acids, e. g. those of the acrylic and methacrylic acid series, fibre- or film-forming polyamides, e. g. the products obtained by condensation of diamines with dicarboxylic or disulphonic acids or by self-condensation of amino-carboxylic or amino-sulphonic acids, and the other plastic polymers obtainable by condensation of bi-functional reagents.

In case of organic plastic materials that have sufficient softness, no plasticizer or softeners need be added. With other materials, substances such as plasticizers in amounts to render the material softer, reducible to liquid or more plastic are preferably employed. Examples of plasticizers for cellulose acetate and the like materials are triacetin, triphenyl acetin, tripropionin, dimethyl phthalate, diethyl phthalate, dimethoxy ethyl phthalate, dibutyl tartrate and the sulphonamides, such as p-toluene sulphonamide. These plasticizers may be use in amounts of 30 to 85% of the weight of the cellulose acetate.

When used, the plasticizers are preferably distributed throughout the cellulose acetate in as uniform a manner as possible. This may be effected by treating the cellulose acetate with a solution or dispersion of the plasticizer in water, benzene, ether or other non-solvent for cellulose acetate, allowing the cellulose acetate to absorb the plasticizer from the solution or dispersion and removing the solvent by evaporation as described in U. S. Patent No. 1,999,405. Another method by which the agents may be uniformly distributed comprises treating the cellulose acetate with a solution or dispersion of the agents in a volatile solvent for the cellulose acetate or by adding the agents to a solution of the cellulose acetate in a volatile solvent. In the former case the materials are worked, e. g. by malaxation, until the substance is dissolved. When a uniform solution and/or dispersion of the components has been obtained, the volatile solvent may be evaporated, either wholly or in part, so as to leave the required composition. The material so formed may be worked under heat and pressure to form homogeneous masses which may be molded, rolled, or cut into sheets of the required thickness and size.

As the metal sheet component of the laminated product used for making the vehicle body parts, there may be used any suitable metal, particularly steel which may be of any suitable composition such as ordinary carbon steel or so-called stainless steel that contains chromium or chromium and nickel. Since the steel sheets are used merely as protection for the organic plastic sheets against scratching, weathering, etc., they may be quite thin having a thickness of say 0.015 to 0.05 inch.

The laminated sheet material used in this invention may be made of one or more metal sheets and one or more organic plastic sheets, the simplest preferred form being composed of one metal sheet for the exposed side and one organic plastic sheet. However, more complex combinations may be employed, for instance, two, three or more metal sheets alternating with one, two, three or more organic plastic sheets.

The thickness of the organic plastic sheet may range from less than 0.1 to 0.5 inch or more.

In making the laminated or composite sheet material, the organic plastic sheets may be caused to adhere to the metal sheets by any suitable expedients such as by applying heat and pressure with or without adhesives such as polyvinyl acetate.

It is to be understood that the foregoing detailed description is merely given by way of illustration and that many variations may be made therein without departing from the spirit of my invention.

Having described my invention, what I desire to secure by Letters Patent is:

1. A composite material for use in the manufacture of vehicle bodies comprising at least one layer of plastic material each having a thickness of from 0.1 to 0.5 inch laminated in alternation with at least an equal number of layers of metal each having a thickness of from 0.015 to 0.05 inch, to provide at least one external protective layer of metal.

2. A composite material for use in the manufacture of vehicle bodies comprising at least one layer of an organic plastic material each having a thickness of from 0.1 to 0.5 inch laminated in alternation with at least an equal number of layers of metal each having a thickness of from 0.015 to 0.05 inch, to provide at least one external protective layer of metal.

3. A composite material for use in the manufacture of vehicle bodies comprising at least one layer of a cellulose derivative plastic material each having a thickness of from 0.1 to 0.5 inch laminated in alternation with at least an equal number of layers of metal each having a thickness of from 0.015 to 0.05 inch, to provide at least one external protective layer of metal.

4. A composite material for use in the manufacture of vehicle bodies comprising at least one layer of cellulose acetate each having a thickness of from 0.1 to 0.5 inch laminated in alternation with at least an equal number of layers of metal each having a thickness of from 0.015 to 0.05 inch, to provide at least on external protective layer of metal.

5. A composite material for use in the manufacture of vehicle bodies comprising at least one layer of a cellulose derivative material containing a plasticizer therefor, each layer having a thickness of from 0.1 to 0.5 inch, laminated in alternation with at least an equal number of layers of metal each having a thickness of from 0.015 to 0.05 inch, to provide at least one external protective layer of metal.

6. A composite material for use in the manufacture of vehicle bodies comprising at least one layer of cellulose acetate containing a plasticizer therefor, each layer having a thickness of from 0.1 to 0.5 inch, laminated in alternation with at least an equal number of layers of metal each having a thickness of 0.015 to 0.05 inch, to provide at least one external protective layer of metal.

CAMILLE DREYFUS.